(12) United States Patent
Zhu et al.

(10) Patent No.: US 7,349,665 B1
(45) Date of Patent: Mar. 25, 2008

(54) METHOD AND APPARATUS FOR RELAYING A WIRELESS SIGNAL

(75) Inventors: Peiying Zhu, Kanata (CA); Wen Tong, Ottawa (CA); Ming Jia, Ottawa (CA); Jianming Wu, Kanata (CA); Shiquan Wu, Nepean (CA); Steve Beaudin, Ottawa (CA)

(73) Assignee: Nortel Networks Limited, St. Laurent, Quebec (CA)

( * ) Notice: Subject to any disclaimer, the term of this patent is extended or adjusted under 35 U.S.C. 154(b) by 858 days.

(21) Appl. No.: 10/736,699

(22) Filed: Dec. 17, 2003

(51) Int. Cl.
*H04B 7/15* (2006.01)
(52) U.S. Cl. .................................. 455/11.1; 455/15
(58) Field of Classification Search ............ 455/15, 455/20, 11.1, 13.1; 370/279, 280, 281, 315, 370/329, 330
See application file for complete search history.

(56) References Cited

U.S. PATENT DOCUMENTS 5,883,884 A * 3/1999 Atkinson .................... 370/279
2006/0250973 A1* 11/2006 Trott ........................ 370/252

* cited by examiner

*Primary Examiner*—Tu Nguyen

(57) ABSTRACT

Systems and Methods are provided for relaying wireless signals bi-directionally between user equipment (UE) and base station transceivers (BTS). Various slot types are defined during which a relay node takes on the personality of either the UE or the BTS. In order to implement the relay node with a single transceiver chain, a first switching matrix is used to switch high band and low band RF bandpass filters between receive and transmit paths, and a second switching matrix is used to switch two frequency sources between the receive and transmit path. In this way, a single receive path can function both in the UE and BTS personality, as can the single transmit path.

46 Claims, 7 Drawing Sheets

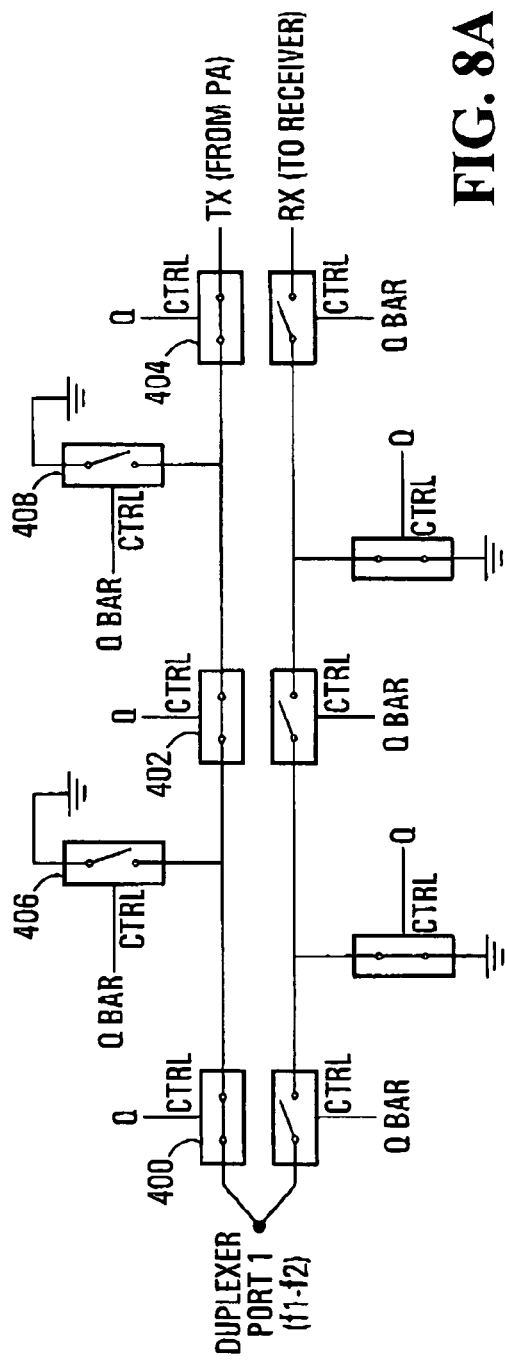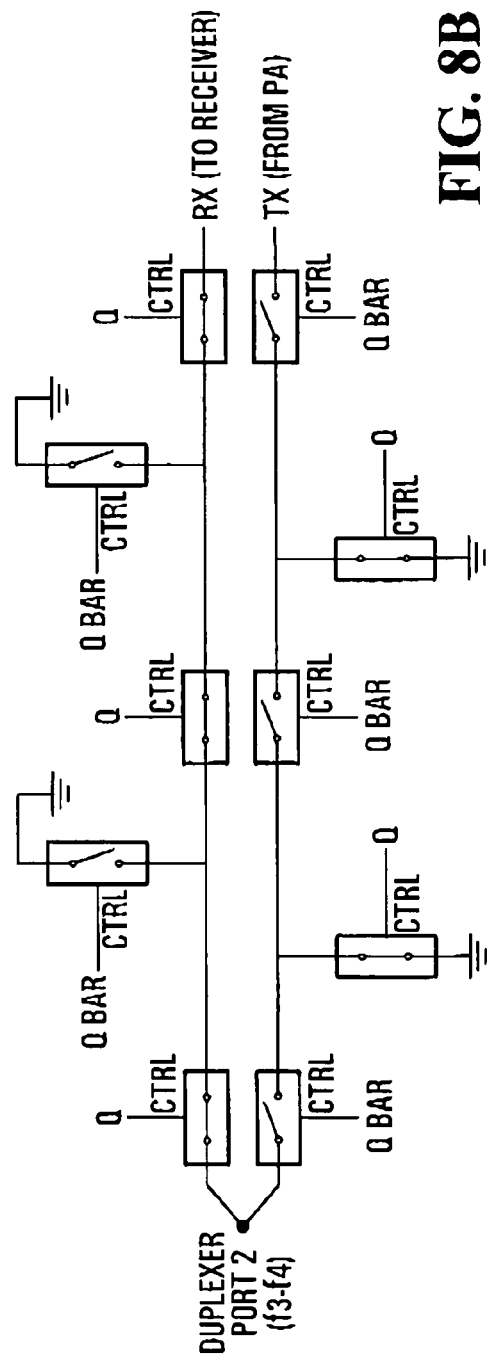

METHOD AND APPARATUS FOR RELAYING A WIRELESS SIGNAL

FIELD OF THE INVENTION

The invention relates to methods and apparatus for relaying wireless signals.

BACKGROUND OF THE INVENTION

Cellular wireless systems typically employ a base station at the center of each cell which provides service to users within that cell. In order to increase the converge area of a given base station, it has been proposed to introduce a relay function within the conventional cellular network. This will allow the extension of the network to a multi-hop network topology in which some mobile users would communicate with the network via the relay function and then the base station.

The conventional relay technology that is available includes analogue relays and digital relays both of which come in the form of external band relays. The available analogue relays require dual RF transceiver chains, and in-band relays which suffer from noise amplification and feedback isolation problems and requires very stringent transmit to receive isolation. The available digital FDD (Frequency Division Duplex) relays require dual RF (Radio Frequency) transceiver chains. TDD (Time Division Duplex) in-band relays can be implemented with one receiver chain.

SUMMARY OF THE INVENTION

According to one broad aspect, the invention provides a method comprising: at a wireless relay: during time slots of a first slot type, receiving communications on a first frequency band and transmitting communications on a second frequency band; during time slots of a second slot type that do not overlap with said time slots of the first type, receiving communications on the second frequency band and transmitting communications on the first frequency band.

In some embodiments, during time slots of the first slot type: said receiving comprises receiving communications from a transceiver of a first transceiver type on the first frequency band and said transmitting comprises transmitting communications to the transceiver of the first transceiver type on the second frequency band; during time slots of the second slot type: said receiving comprises receiving communications from at least one transceiver of a second transceiver type on the second frequency band and said transmitting comprises transmitting communications to at least one transceiver of the second transceiver type on the first frequency band.

In some embodiments, the method further comprises: at the wireless relay during time slots of a third slot type, transmitting substantially nothing.

In some embodiments, the method comprises operating in a defined sequence of time slots of the first, second and third slot types.

In some embodiments, receiving communications on the first frequency band, transmitting communications on the second frequency band, receiving communications on the second frequency band and transmitting communications on the first frequency band are all done using a single transceiver chain.

In some embodiments, the method further comprises: between a slot of said first slot type and a next slot of said second slot type, reconfiguring the single transceiver to behave like a transceiver of a first transceiver type; between a slot of said second slot type and a next slot of said first slot type, reconfiguring the single transceiver to behave like a transceiver of a second transceiver type.

In some embodiments, reconfiguring the single transceiver to behave like a transceiver of the first transceiver type comprises connecting a first and second frequency signal for upconversion and downconverion respectively; reconfiguring the single transceiver to behave like a transceiver of the second transceiver type comprises connecting the second and first frequency signal for upconversion and downconverion respectively.

In some embodiments, reconfiguring the single transceiver to behave like a transceiver of the first transceiver type further comprises connecting a first filter and a second filter for receive and transmit filtering respectively; reconfiguring the single transceiver to behave like a transceiver of the second transceiver type further comprises connecting the second filter and the first filter for receive and transmit filtering respectively.

In some embodiments, the transceiver of the first transceiver type is a user equipment and the transceiver of the second transceiver type is a base station transceiver.

In some embodiments, the transceiver of the first transceiver type is a network access node, and the transceiver of the second transceiver type is a base station transceiver.

In some embodiments, the method further comprises: during time slots of said first slot type, the transceiver of the first type communicating bi-directionally with the wireless relay; during time slots of said second slot type, at least one transceiver of the second type communicating bi-directionally with the wireless relay; during time slots of a third slot type, the transceiver of the first type communicating directly bi-directionally with at least one transceiver of the second type.

In some embodiments, all communications are OFDM (Orthogonal Frequency Division Multiplexing) communications.

In some embodiments, the method further comprises: defining a first umbrella frequency band and a second frequency umbrella band; during slots of both said first slot type and said second slot type, communicating directly from a transceiver of a first transceiver type and at least one transceiver of a second transceiver type on the first umbrella frequency band, and communicating directly from at least one transceiver of the second transceiver type and the transceiver of the first transceiver type on the second umbrella frequency band.

In some embodiments, during time slots of the first slot type: the wireless relay receives communications from the transceiver of the first transceiver type on the first frequency band and transmits communications to at least one transceiver of the second transceiver type on the second frequency band; during time slots of the second slot type: the wireless relay receives communications from at least one transceiver of the second transceiver type on the second frequency band and transmits communications to at least one transceiver of the second transceiver type on the first frequency band.

In some embodiments, the first frequency band and the first umbrella band are adjacent and collectively comprise an uplink frequency band; the second frequency band and the second umbrella band are adjacent and collectively comprise a downlink frequency band.

In some embodiments, the method comprises operating in a defined sequence of time slots of the first and second type.

In some embodiments, receiving communications on the first frequency band and transmitting communications on the second frequency band, receiving communications on the second frequency band and transmitting communications on the first frequency band are all done using a single transceiver chain.

In some embodiments, the method further comprises: between a slot of said first slot type and a slot of said second slot type, reconfiguring the single transceiver to behave like a transceiver of said first transceiver type; between a slot of said second slot type and a slot of said first slot type, reconfiguring the single transceiver to behave like a transceiver of said second transceiver type.

In some embodiments, reconfiguring the single transceiver to behave like a transceiver of the first transceiver type comprises connecting a first and second frequency signal for upconversion and downconverion respectively; reconfiguring the single transceiver to behave like a transceiver of the second transceiver type comprises connecting the second and first frequency signal for upconversion and downconverion respectively.

In some embodiments, reconfiguring the single transceiver to behave like a transceiver of the first transceiver type further comprises connecting a first filter and a second filter for receive and transmit filtering respectively; reconfiguring the single transceiver to behave like a transceiver of the second transceiver type further comprises connecting the second filter and the first filter for receive and transmit filtering respectively.

In some embodiments, the first transceiver type is a user equipment and the second transceiver type is a base station transceiver.

In some embodiments, the first transceiver type is a network access node, and the second transceiver type is a base station transceiver.

In some embodiments, the first umbrella band and the first frequency band together comprise a first OFDM band; the second umbrella band and the second frequency band together comprise a second OFDM band.

According to another broad aspect, the invention provides a method comprising: at a wireless relay node: during time slots of a first slot type, receiving communications on a first frequency band from a transceiver of a first transceiver type; during time slots of a second slot type, transmitting communications on the first frequency band to the transceiver of the first transceiver type; during time slots of a third slot type, receiving communications on the first frequency band from at least one transceiver of a second transceiver type; during time slots of a fourth slot type, transmitting communications on the first frequency band to at least one transceiver of the second transceiver type.

In some embodiments, the method further comprises: during slots of said first slot type, said second slot type, said third slot type and said fourth slot type, communicating directly from the transceiver of the first transceivers type and at least one transceiver of the second transceiver type on a second frequency band, and communicating directly from at least one transceiver of the second transceiver type and the transceiver of the first transceiver type on a third frequency band.

In some embodiments, the method comprises operating in a defined sequence of time slots of the first, second, third and fourth slot type.

In some embodiments, the second frequency band is a first OFDM band, and the first and third frequency bands together comprise a second OFDM band.

In some embodiments, the wireless relay adapts to implement a method as summarized above.

In some embodiments, the system comprises a wireless relay, a transceiver of a first type, and at least one transceiver of a second type collectively adapts to implement a method as summarized above.

According to another broad aspect, the invention provides a wireless relay comprising: a receiver chain; a transmit chain; a first frequency filter and a second frequency filter alternatively switchable such that either the first frequency filter filters for the receive chain and the second frequency filter filters for the transmit chain, or the second frequency filter filters for the receive chain and the first frequency filter filters for the transmit chain; a first frequency source and a second frequency source alternatively switchable such that either the first frequency source is connected to the receive chain and the second frequency source is connected to the transmit chain, or the second frequency source is connected to the receive chain and the first frequency source is connected to the transmit chain.

In some embodiments, the wireless relay comprises a first two by two switch which in a first state connects the first frequency source to the receive chain and connects the second frequency source to the transmit chain, and in a second state connects the second frequency source to the receive chain and connects the first frequency source to the transmit chain.

In some embodiments, the wireless relay comprises a second two by two stitch which in a first state connects the first frequency filter to the receive chain and connects the second frequency filter to the transmit chain, and in a second state connects the second frequency filter to the receive chain and connects the first frequency filter to the transmits chain.

In some embodiments, the first and second two by two switches each comprise a respective plurality of SPST (Single Pole Single Throw) switches.

In some embodiments, each SPST switch comprises switching elements selected from a group consisting of: PiN diode, MEMS (Micro Electromechanical Systems) device, and high power FET.

BRIEF DESCRIPTION OF THE DRAWINGS

Preferred embodiments of the invention will now be described with reference to the attached drawings in which:

FIGS. 8A and 8B are schematic diagrams of an example implementation of a 2×2 switching matrix.

DETAILED DESCRIPTION OF THE PREFERRED EMBODIMENTS

Figure 1A:
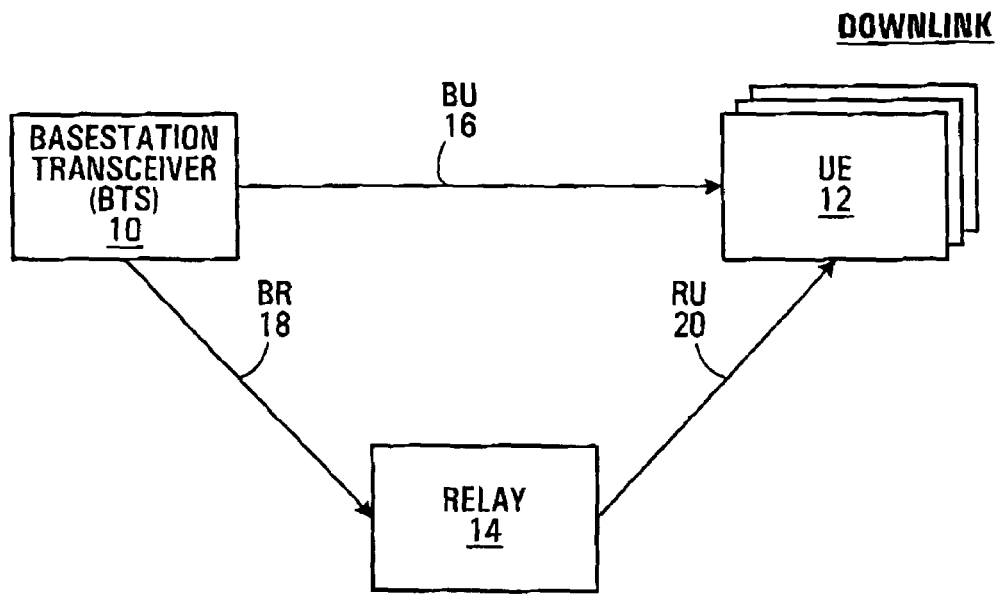
FIG. 1A is a block diagram showing a relay provided by an embodiment of the invention providing downlink communications.

Embodiments of the invention will now be described with reference to FIGS. 1A and 1B. Each of these figures shows a BTS (Base Station Transceiver) 10, a wireless relay 14, and a user equipment (UE) 12. The BTS 10 might for example be a normal cell site base station, and would be capable of delivering the full services to the UE 12, whatever those services might be. In a given network, typically there would be a collection of BTSs 10. The UE 12 is a wireless terminal which may be fixed or mobile and is obtaining service via the BTS 10. Typically, there would be a large number of UEs 12 within the coverage area of the BTS 10. Relay 14 is a node within the coverage area of BTS 10 which implements a relaying function to extend the coverage area beyond the normal range of the BTS 10. In FIG. 1A, the potential connectivities between the nodes 10,12,14 in respect of downlink communications from the BTS 10 to the UE 12 are shown. There is the possibility for direct communications from the BTS 10 to a UE 12, labelled BU (BTS to UE) 16. There is also the possibility of communications from the BTS 10 to a UE 12 via the relay 14. This will consist of communications BR (BTS to Relay) 18 from the BTS 10 to the relay 14, and communications RU (Relay to UE) 20 from the relay 14 to the UE 12. Whether or not the direct link consisting of BU 16 or the relay link consisting of BR 18 and RU 20 is selected for a given UE 12 will typically depend upon the location of the UE 12 in terms of distance from the BTS 10. Other criteria may alternatively or additionally be factored in.

Figure 1B:
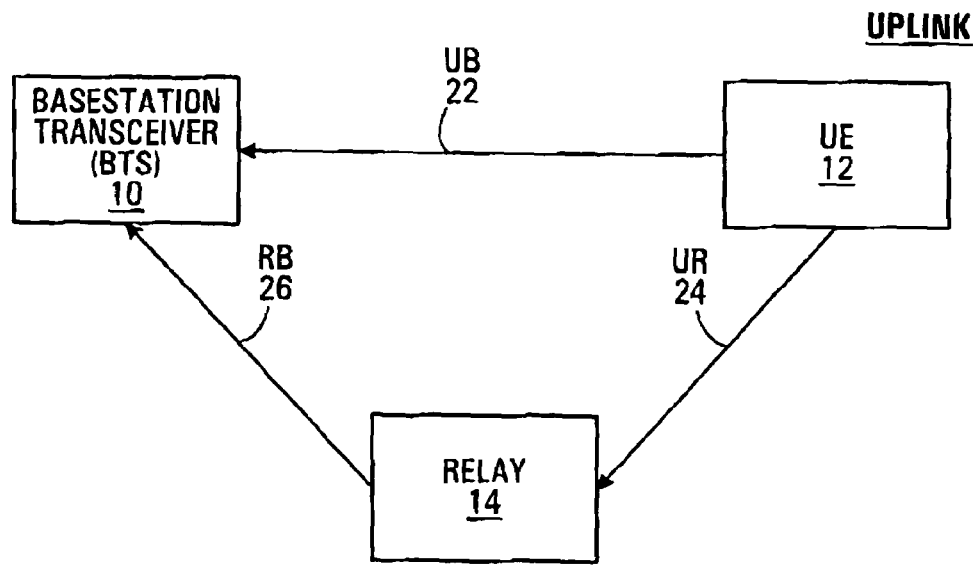
FIG. 1B is a block diagram showing the relay of FIG. 1A providing uplink communications.

FIG. 1B shows the uplink communications from the UE 12 to the BTS 10. This can be done directly as indicated by link UB (UE to BTS) 22 from the UE 12 to the BTS 10. Alternatively, this can be done via the relay 14 using link UR (UE to Relay) 24 from the UE 12 to the relay 14, and link RB (Relay to BTS) 26 from the relay 14 to the BTS 10.

Figure 1C:
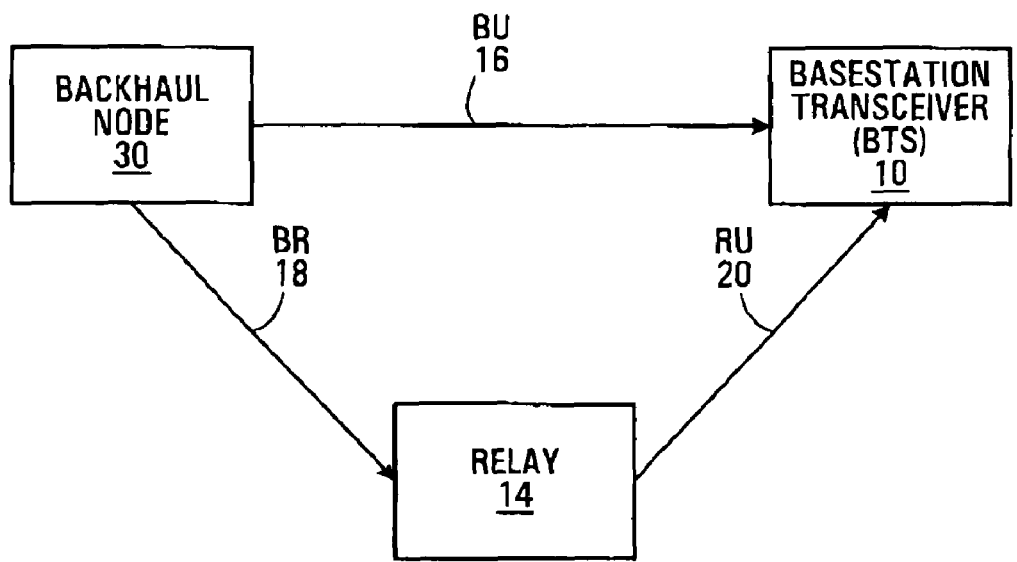
FIG. 1C is a block diagram showing relay functionality for a backhaul node to a base station transceiver.

In the embodiments which will be descried herein in detail, it is assumed that the relaying function is implemented between the BTS 10 and the UE 12. This will involve utilization of the spectral resources allocated for such communications. In another embodiment, summarized in FIG. 1C, the relay 14 is used to provide a relay function between the BTS 10 and a backhaul node 30 such as a network access node, which would provide access to the communications backbone for example. Although in this case, the wireless links between the various nodes of FIG. 1C would be implemented using a different set of spectral resources than those used in the embodiments of FIGS. 1A and 1B since user communications are not being provided, the methods and systems used to deliver the relay functionality for the embodiments of FIGS. 1A and 1B versus the embodiments of FIG. 1C is substantially the same. Only system parameters need be changed for the various applications. It can easily be seen that the relay functionality can also be employed in other wireless communications contexts wherever it is required to extend the range of a wireless communications link between a transceiver(s) having a first transceiver type and a transceiver(s) having a second transceiver type.

Figure 2:
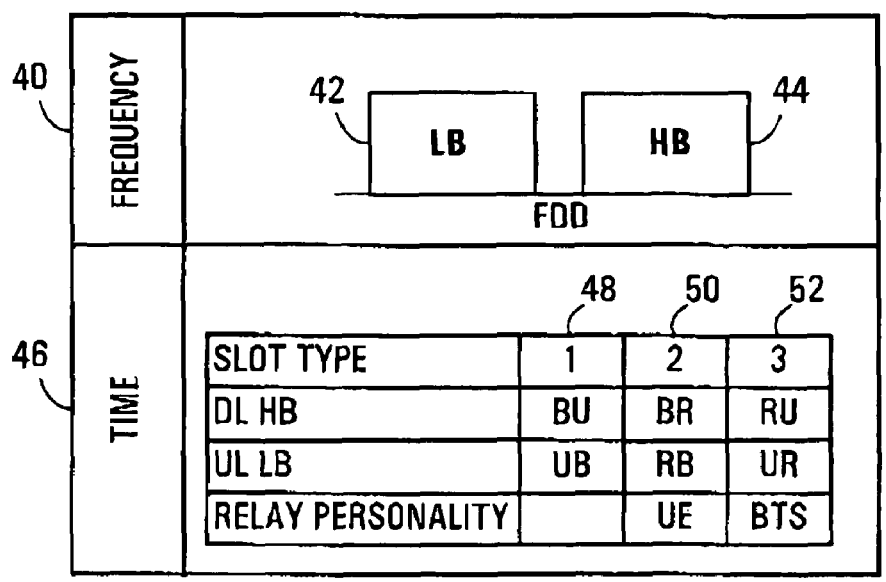
FIG. 2 is a time-frequency diagram illustrating a first relay mode provided by an embodiment of the invention.

Referring now to FIG. 2, shown is a time and frequency breakdown of a first relay mode provided by an embodiment of the invention. In the frequency dimension, indicated at 40, there is a low band LB 42 and a high band HB 44. The low band 42 is used for uplink communications whereas the high band 44 is used for downlink communications. Equivalently, these functions could be reversed. Typically, these bands would be defined by the communications standards which are being implemented by a given system.

In the time dimension indicated at 46, transmission is arranged slot wise with slots of three different types, namely slot type 1 48, slot type 2 50, and slot type 3 52. Each slot type defines selected links of the links discussed previously with respect to FIGS. 1A and 1B that are activated during time slots having that slot type. In particular, during a slot having slot type 1 48, for the downlink only link BU 16 is active. Similarly, for the uplink, only UB 22 is active. Thus, during slots having slot type 1 48 only direct communications between the BTS 10 and the UE 12 are performed. During a slot having the slot type 2 50 for the downlink, only link BR 18 is active, namely between the BTS 10 and the relay 14. On the uplink, only link RB 26 is active, namely from the relay 14 to the BTS 10. Finally, during a slot having the slot type 3 52, on the downlink only link RU 20 between the relay 14 and the UE 12 is active. Similarly, on the uplink, only link UR 24 between the UE 12 and the relay 14 is active. In summary, during slots of each slot type, both the uplink and downlink are active, and as such both the low band 42 and the high band 44 are being used for transmissions. However, in the space dimension as illustrated in FIGS. 1A and 1B, only particular links are active.

The relay 14 has a different function for each slot type. In particular, for slot type 1 48, since there are only direct communications between the UE 12 and BTS 10, there is no need for any relay functionality and as such the relay personality is null. During slot type 2 50, the relay needs to provide both uplink and downlink communications between the relay and the BTS 10. As such, during slots having this slot type, the relay needs to behave as though it were a UE 12 at least from the perspective of BTS 10. Thus, it is shown to have relay personality "UE" during slot type 2 50 in the time dimension. Finally, during the slot type 3 52, the relay 14 is communicating bi-directionally with the UE 12, and as such it must take on the personality of the BTS 10. Thus, the relay personality during slots of that slot type is "BTS".

It can be seen with this embodiment that the relay 14 is only communicating with the BTS 10 or the UE 12 in a given time slot. This enables a very efficient design of the relay 14. An example implementations of the relay 14 will be described below with reference to FIG. 3.

In one embodiment, a sequence of slots having slot types 1, 2 and 3 is repeated on an ongoing basis. Thus, the first slot and every third slot thereafter will have the characteristics of slot type 1 48. The second slot and every third slot thereafter will have the characteristics of slot type 2 50, and the third slot and every third slot thereafter will have the characteristics of slot type 3 52. It is to be understood that the order of slots 1, 2 and 3 can be changed.

In another embodiment, further flexibility in the slot scheduling is provided. For example if there are more users in the area where direct communications can be employed, additional slot type 1 slots for direct communications can be provided at the expense of the relay slots having slot types 2 and 3. Similarly, if there are more users in the coverage area requiring relay functionality, the number of slot type 1 direct communication slots can be reduced so that the number of relay slots having slot types 2 and 3 can be increased.

This embodiment is not limited to particular communications technologies being employed on the low band 42 and the high band 44. However, in a preferred embodiment of the invention, OFDM (Orthogonal Frequency Division Multiplexing) communications are employed. Other potential applications include CDMA, GSM for example.

In the illustrated embodiment, while the relay 14 has relay personality "BTS", it is capable of receiving communications from the UE 12 on the high band 44, and transmitting communications to the UE 12 on the low band 42. Similarly, while the relay 14 has relay personality "UE" it is capable of receiving communications from the BTS 10 on the low band 44, and sending transmissions to the transceiver 10 on the high band 42. In the embodiment of FIG. 2, the BTS 10, relay 14, and UE 12 (more generally each UE 12) will need to know the slots during which it is expected to communicate. In one embodiment, this is done using a signalling channel. The signalling channel informs a given UE 12 during which slots it would be expected to communicate. It is noted that the functionality of the UE 12 during a slot type 1 slot and a slot type 3 slot is the same. The only difference is that for slot type 3 slots, the communications are intercepted by the relay 14. Similarly, a signalling channel informs the relay 14 of the slots during which it is implementing a UE relay personality and a BTS relay personality. Finally, this BTS 10 also needs to know during which slots it is expected to communicate. Like the UE 12, the slot type 1 communications and slot type 2 communications for the BTS 10 are the same, the only difference being that for slot type 2 communications the signal is intercepted by the relay 14.

Any appropriate method of establishing the various slot times for each device within the network can be employed. As discussed above, a signalling channel may be used to this effect. Alternatively, these schedulings could be performed during call set-up.

It is also to be understood that in a sequence of slots having slot types 1, 2, 3, the particular UE involved may be selected on a per slot basis. Thus, a first type 1 slot may involve communications with a first UE followed by a type 2 slot and a type 3 slot for communicating with a second UE.

Figure 3:
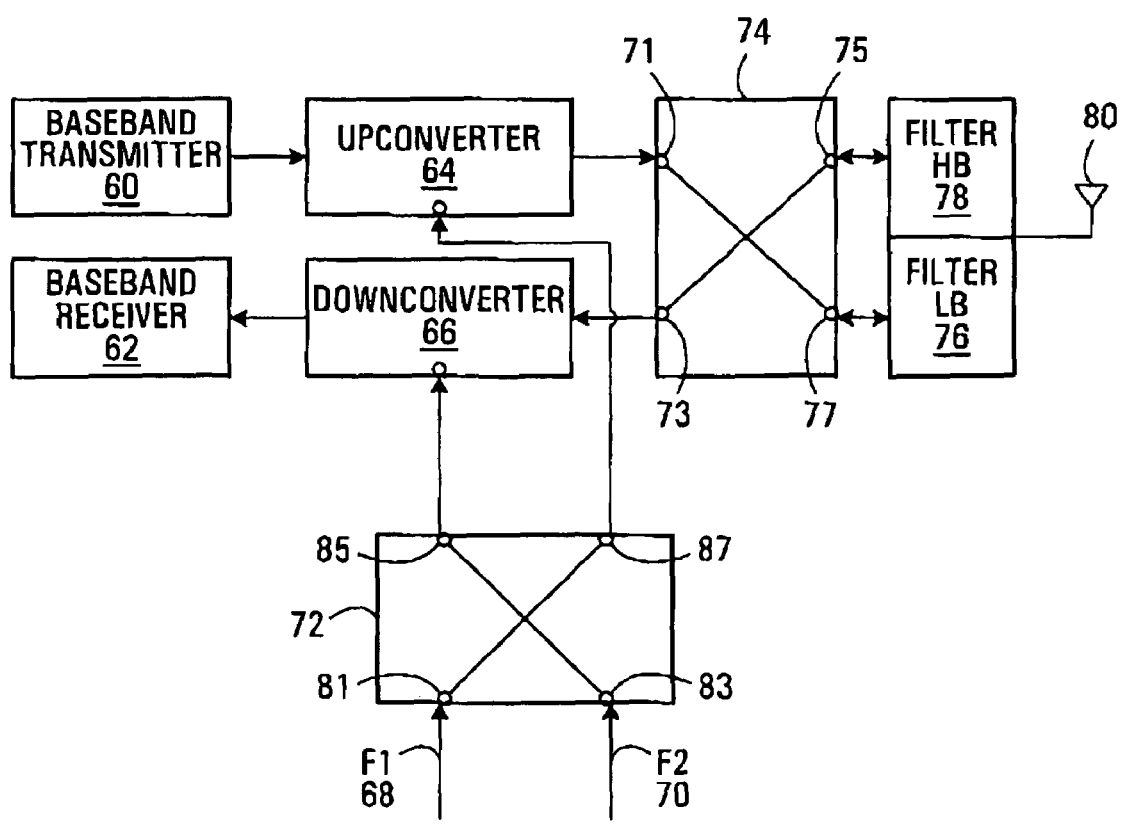
FIG. 3 is a block diagram of a relay for implementing the relay mode of FIG. 2.

Referring now to FIG. 3, shown is a block diagram of an example implementation of the relay 14. This relay design has the advantage that only a single transceiver chain (one transmit chain and one receive chain) is required even though the transmit chain will be required to operate on two different bands, as will the receive chain. Shown is an antenna 80 which might for example be an omnidirectional antenna or a switched antenna. The antenna 80 is connected to a duplexer consisting of a first filter 76 which filters at the low band frequency, and a second filter 78 which filters at the high band frequency. The two filters 76,78 are connected to two ports 75,77 respectively of a 2×2 stitch 74. For transmit functionality, the relay is shown to include a baseband transmitter 60 connected to an upconverter 64 having an output connected to a port 71 of the 2×2 stitch 74. For receive functionality, another port 73 of the 2×2 switch 74 is shown connected to a downconverter 66 which is in turn connected to a baseband receiver 62.

Also shown are two frequency signals, a first at frequency F1 indicated at 68, and a second at frequency F2 indicated at 70. These two frequency signals are input to ports 81 and 83 of a second 2×2 switch 72. A first output port 85 of the second 2×2 switch 72 is connected to an input of the downconverter 66. A second output port 87 of the 2×2 switch 72 is connected to an input of the upconverter 64.

Figure 4:
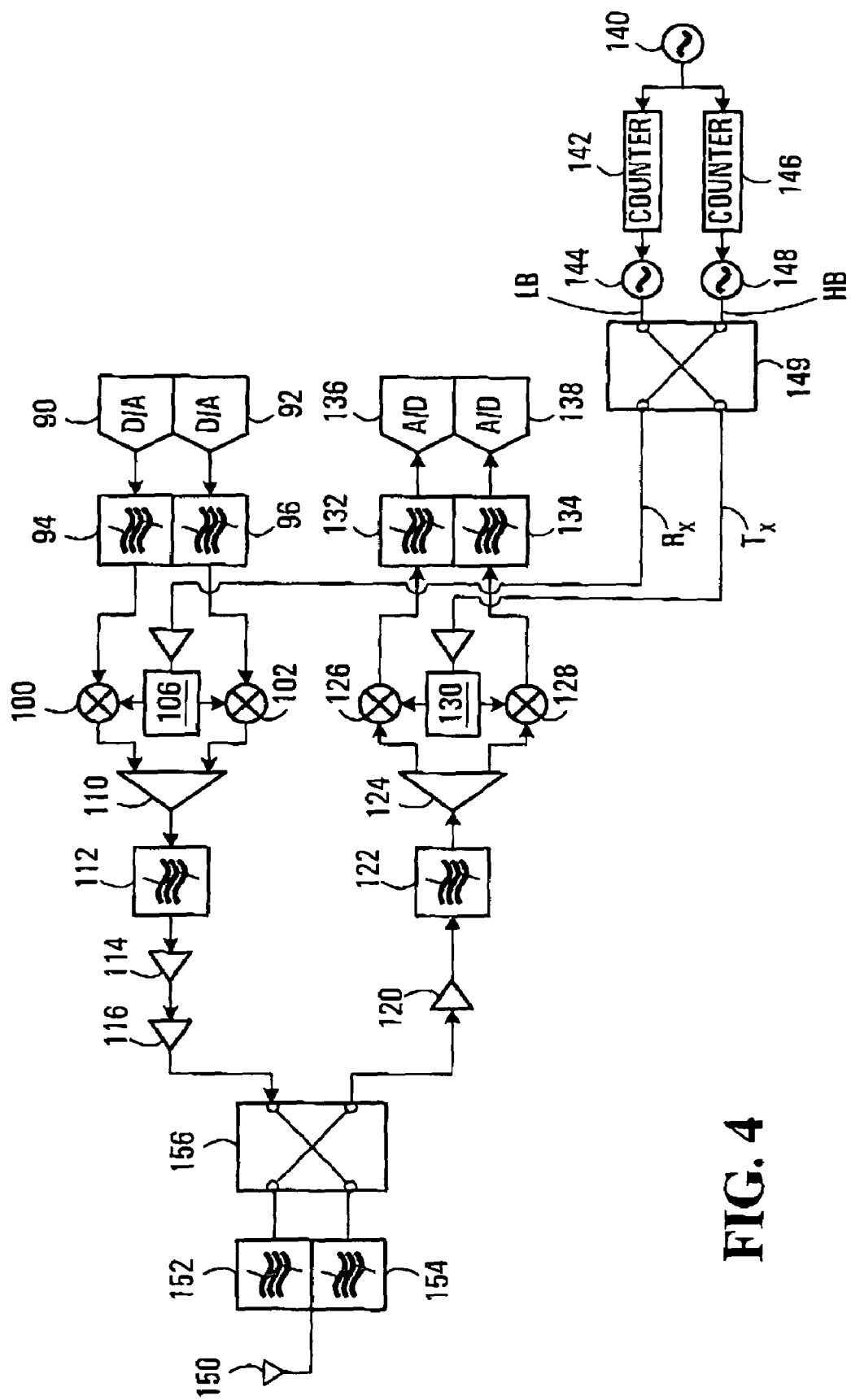
FIG. 4 is a block diagram of another relay for implementing the relay mode of FIG. 2.

It is to be understood that different applications may include additional features to those shown in FIG. 3. For example, a more detailed embodiment is shown in FIG. 4, described below.

It should also be appreciated that the cross-connection between input and output ports of the 2×2 switches 72, 74 is intended solely as a representation of the switches and do not indicate any fixed port connections. The connections between ports are switched to provide required connectivity between frequency signals 68, 70 and the upconverter 64 and the downconverter 66, and between the filters 76 and 78 and the upconverter 64 and the downconverter 66.

In operation, the relay of FIG. 3 can be set to operate in either the "UE" personality or the "BTS" personality by an appropriate setting of the two 2×2 switches 72, 74. More particularly, in order to deliver the "UE" personality, the relay needs to operate on the high band for transmitting and the low band for receiving. Thus, the first 2×2 switch 72 is configured to send the higher of the two frequencies F1, F2 to the upconverter 64, and to send the lower of that two frequencies F1, F2 to the downconverter 66. Also, the second 2×2 switch 74 is configured so that the output of the upconverter 64 passes through the high band filter 78, whereas the input to the downconverter 66 is received via the low band filter 76.

It can be seen that by including the two 2×2 switches 72, 74, the necessity for two separate receive chains and two separate transmit chains has been eliminated. The functionality of the baseband transmitter 60 and the baseband receiver 62 will be implementation specific. Similarly, the functionality of the upconverter 64 and the downconverter 66 will be implementation specific. The embodiment of FIG. 3 can be implemented using various antenna structures. Finally, while it is preferred that both 2×2 switches 72, 74 be implemented, in another embodiment, only one of the two switches is implemented. In such embodiments, it would be necessary to provide alternative means of providing either the two filtering functionalities, or the two frequencies. For example, the filtering arrangement of FIG. 3 in another embodiment is replaced with a transmit filter and a receiver filter each of which have switchable characteristics so that they can switch between filtering the high band or the low band. If each filter has the ability to take on either of these filtering possibilities, then the necessity for the 2×2 switch 74 is eliminated.

Another embodiment of the relay 14 will now be described with reference to FIG. 4. In this embodiment, to generate frequencies for upconversion and downconverion, shown is a first reference oscillator 140. This is connected to counters 142, 146 which have respective outputs connected to local oscillators 144, 148. The output of local oscillator 148 is a high band frequency signal and the output of oscillator 144 is a low band signal. These two signals are connected to a 2×2 switch 149 capable of switching either of the two frequency signals to either of the two outputs of the 2×2 switch. The RF functionality of the relay of FIG. 4 includes an antenna 150, a duplexing filter arrangement having two filters 152, 154, and a 2×2 switching matrix 156. The 2×2 switching matrix 156 is capable of switching the signals received to/from each of the two filters 152, 154 as described previously in the embodiment of FIG. 3.

The transmit functionality includes I and Q D/A converters 90, 92 having outputs connected to baseband filters 94, 96. The baseband filters 94, 96 are connected to multipliers 100, 102 respectively. The selected one of the two frequency signals output by the 2×2 switch 149 is fed to the two multipliers 100, 102 with a 90° phase shift being applied by phase shifter 106 to the signal input to one of the two multipliers. The signals output by multipliers 100, 102 are combined at 110 filters at 112, passed through power amplifier driver 114, main power amplifier 116 and finally connected to a first input of the 2×2 switch matrix 156.

The receive functionality includes a low noise amplifier 120 connected to an output of the 2×2 switch 156. The output of the low noise amplifier 120 is connected to a filter 122, an I/Q splitter 124 having two outputs connected to downconverting multipliers 126, 128. The other of the two frequency signals output by the 2×2 switch 149 is input to the two multipliers 126, 128 with one of the two multipliers being fed a version of the signal which has been 90° phase shifted by phase shifter 130. The outputs of the two multipliers 126, 128 are fed to two baseband filters, 132, 134 the outputs of which are connected A/D converters 136,138. The filters 152,154 will have application specific frequency ranges. For example, for UMTS, the frequency range is 5 MHz, the LB frequency is centered at 1920 MHz and the HB frequency is centered at 2110 MHz.

The previously defined slot types will dictate which configuration of the relay is required during a given slot. For the particular slot types defined in FIG. 2, the transceiver is reconfigured between a slot type of the second type and a next slot of the third slot type. If there are intervening type 1 slots no additional reconfiguration is required. Similarly, the transceiver is reconfigured between a slot of the third type and a next slot of the second type.

Figure 5:
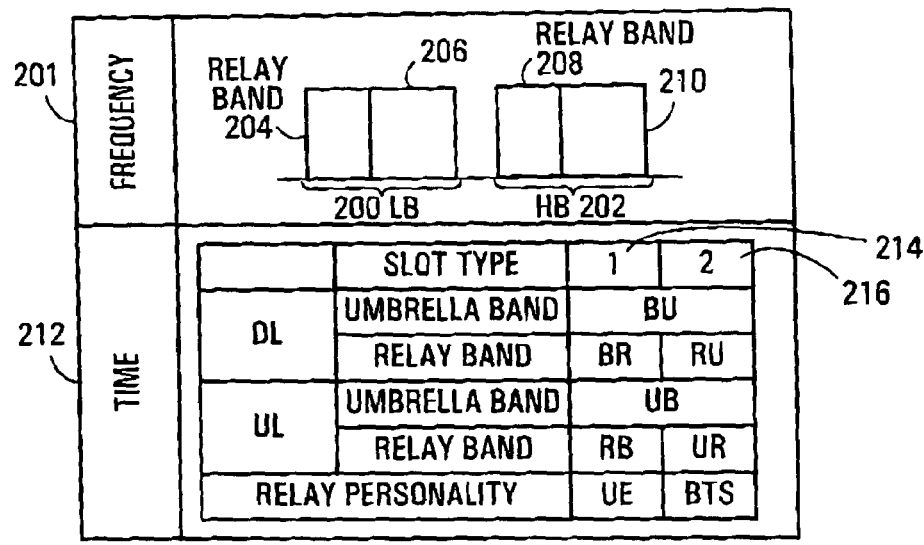
FIG. 5 is a time-frequency diagram showing another relay mode provided by an embodiment of the invention.

A relay mode provided by another embodiment of the invention will now be described with reference to FIG. 5. In this embodiment, in the frequency dimension 201 there is again a low band 200 and a high band 202. However, the low band 200 has been divided into a first relay band 204 and a first umbrella band 206 and the high band 202 has been divided into a second relay band 208 and a second umbrella band 210. The umbrella bands 206,210 will be used for direct communications between the BTS and UEs. Thus, referring to FIGS. 1A and 1B, these would be used for communications over links BU 16 and UB 22. The relay bands 204,208 are used for relay communications. The time dimension 212 shows a slot structure having two slot types namely slot type 1 214 and slot type 2 216. During slot type 1 slots 214, on the downlink, the second umbrella band 210 is used for direct communications BU 16 from the BTS 10 to the UE 12, and the second relay band 208 is used for BTS 10 to relay 14 communications BR 18. On the uplink, the first umbrellas band 206 is used for UE 12 to BTS 10 communications UB 22, and the first relay band 204 is used for relay 14 to BTS 10 communications RB 26. During slot type 1 slots 214, the relay has relay personality "UE". During slot type 2 slots 216, the two umbrellas bands 206,210 behave the same as in type 1 slots 214. On the downlink, the second relay band 208 delivers relay 14 to UE 12 communications RU 20. On the uplink, the first relay band 204 is used to deliver UE 12 to relay 14 communications UR 24. During slots of type 2 216, the relay personality is "BTS".

As was the case with the embodiment of FIG. 2, the various devices 10,12,14 would need to know the scheduling of the various slot types, and any appropriate mechanism for achieving this can be employed. In a preferred embodiment, OFDM communications are employed for the various links. With such embodiments, no change would be required in existing hardware at the base station or user equipment. Rather, a simple bandwidth scaling would be employed to create relay bands for relay link TDM operation. In some embodiments, BTS, UE and relay equipment operate on the entire frequency band (umbrella=relay), extract the corresponding data from sub-carriers within the band (umbrella or relay) and ignore the data on the rest of sub-carriers on receiving. On transmitting, they map data to the sub-carriers within the corresponding frequency band (umbrella or relay) and pad zeros on the rest of sub-carriers. In the embodiment of FIG. 5, it has been assumed that the relay bands and the umbrella bands are contiguous. However, this need not necessarily be the case. For OFDM systems, they could use any two sets of different sub-carriers.

The relay architecture for this embodiment can be implemented the same as for the previous embodiment.

Figure 6:
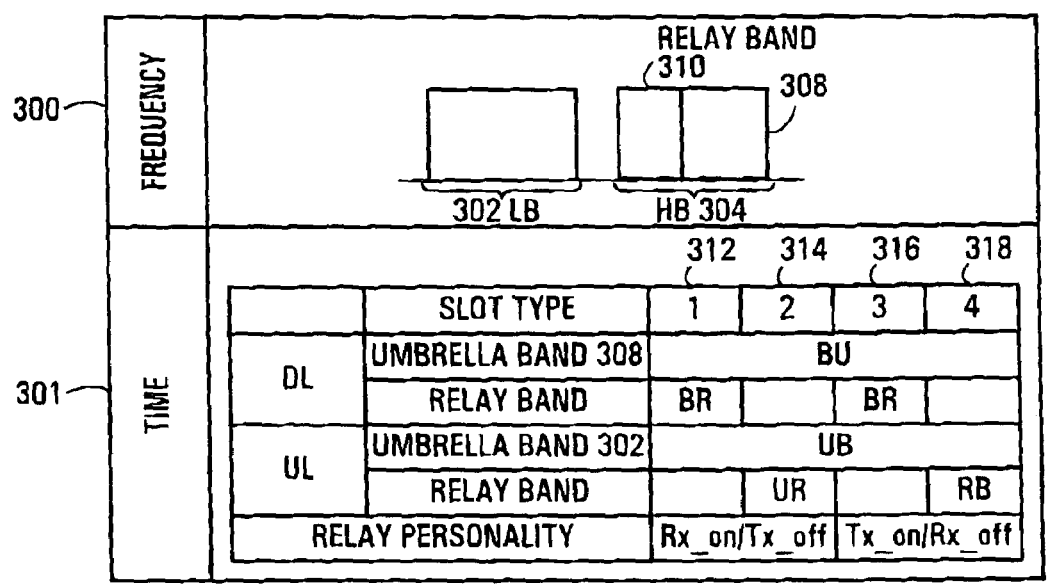
FIG. 6 is a time-frequency diagram showing a third relay mode provided by an embodiment of the invention.

A third relay mode provided by another embodiment of the invention will now be described with reference to FIG. 6. In the frequency dimension 300, there is again a low band 302 and a high band 304. The entire low band 302 is used as an umbrella band for uplink communications. For downlink communications, there is an umbrella band 308 forming part of high band 304. Also shown is a relay band 310 which takes up part of the high band 304. The relay band 310 is allocated in a time division duplex manner between the four relay channels BR 18, RU 20, UR 24 and RB 26 of FIGS. 1A and 1B.

More specifically, four different slot types are defined as shown in the time dimension 301. During all four slot types, the low band 302 is used as an umbrellas band for uplink communications which are direct between the UE 10 and BTS 10. Similarly, umbrella band 308 is used during slots of all four types for direct downlink BTS 10 to UE 12 communications. The relay band 310 is allocated on a per slot basis between four different functions. During slots of slot type 1 312, the relay band takes on the functionality of delivering link BR 18 of FIG. 1A, consisting of BTS 10 to relay 14 communications. During slots of slot types 2 314, the relay band is used to deliver UE 12 to relay 14 communications UR 24. During slots of slot type 3 316, the relay band is used to deliver communications from relay 14 to UE 12 RU 20. Finally, during slots of slot type 4 318, the relay band is used to deliver communications from the relay 14 to the BTS 10, namely RB 26. The relay personality during slots of slot type 1 312 and slot type 2 314 involves the receiving functionality of the relay being on and the transmit functionality being off. However, the frequency of reception will switch between slots of type 1 and slot of type 2. Similarly, for slots of types 3 and 4, the relay will have its transmit functionality on and its receive functionality off. However, again the frequency of operation will switch between slots of types 3 and 4. A particular arrangement of the bands has been shown in FIG. 7.

More generally, all that is required for this embodiment is three different bands, one of which is use for BU communications, one of which is used for UB communications, and the remaining one of which is used for all of the relay band communications.

Figure 7A:
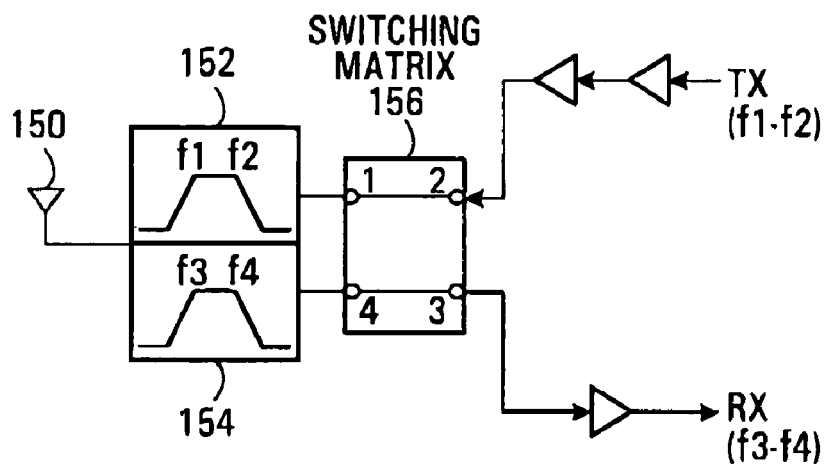
FIGS. 7A and 7B show the 2×2 switching matrix of FIG. 4 in two states.
Figure 7B:
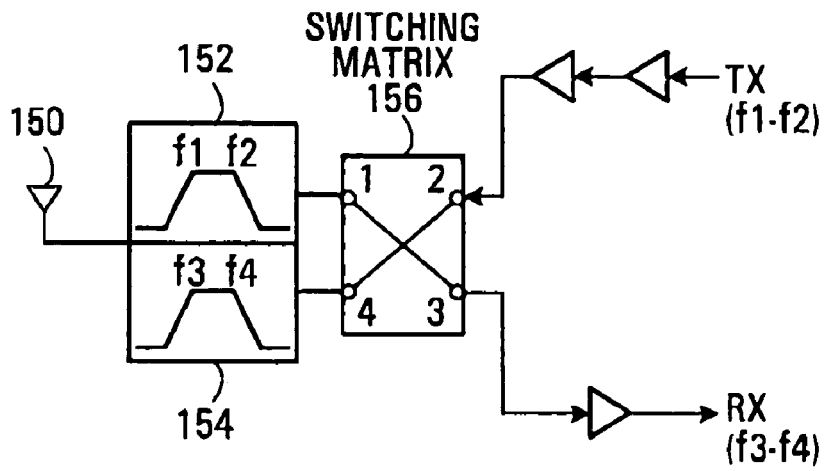

A preferred implementation of the switching matrix 156 of FIG. 4 will now be described with reference to FIGS. 7A and 7B. FIG. 7A shows the switching matrix 156 in a first state in which the transmitter output is connected through the high band filter 152 and the receiver is connected through the low band filter 154. FIG. 7B shows the switching matrix 156 in a second state in which the transmitter is connected through the low band filter 154, and the receiving functionality is connected through the high band filter 152. The switching matrix 156 allows transmitting and receiving simultaneously in different bands. There is no overlap between the transmit and the receive bands.

Thus, a switching matrix allows the complete reversal of the TX/RX chain connection with a duplexer. The transmit/receive isolation is determined in combination by the duplexer and the switching matrix. Depending upon the quality of the duplexer, it may be necessary to have a switch isolation of approximately 80 dB, which is more demanding than would be the case with a simple TDD (Time Division Duplex) radio. Preferably, the switching matrix is implemented using a high IP3 (third order inter-modulation product) switch (greater than 65 dBm) so as not to impact the transmit emission mask. Also, preferably the switching matrix is low loss (preferably approximately 1 dB) to minimize the receive noise figure and transmit loss. As indicated above, preferably there is very good isolation, for example greater than 80 dB, between the two branches. This is primarily driven by power amplifier receive band noise. The isolation of the switching matrix should be sufficient to suppress power amplifier noise to thermal noise levels. A secondary consideration is to protect the receiver from being saturated by transmit power. Finally, preferably less than a 10 micro second transition time between states is provided to minimize reduction in capacity. More generally, the constraints on the performance of the switching matrix will be implementation specific.

FIGS. 8A and 8B shows an example implementation of a 2×2 switching matrix which can achieve these desired characteristics. This design consists of multiple SPST (Single Pole Single Throw) stitches in each branch of the switching matrix. Typical isolations of 20 dB can be achieved with a single stage switch at 2 GHz. Thus, four stages should provide 80 dB isolation. Insertion loss of 0.2 to 0.3 dB per stage will result in an overall insertion loss of 1 to 1.5 dB for the entire arrangement. Referring now to FIGS. 8A and 8B, the switching matrix is shown implemented using a set of 20 switching elements. Each switching element is preferably a high power switching element, for example PiN (Positive-Instrinsic-Negative) diode, MEMS (Micro Electromechanical Systems) device, high power FET (Field Effect Transistor) or other suitable high power switching device. For duplexer port 1, shown are three switches 400,402,404 connected together in series with two shunt elements 406,408. This provides connectivity between the duplexer port 1 and the transmitter. Similar functionality is provided for each of the other three potential paths, namely from port 1 to the receiver, from port 2 to the receiver, and from port 2 to the transmitter. The number of series and shunt switching elements can be increased or decreased to increase or decrease the isolation between the two paths. It is to be clearly understood that FIG. 8 is only one specific detailed example of an implementation of a switching matrix. Other 2×2 switch designs can be employed.

Numerous modifications and variations of the present invention are possible in light of the above teachings. It is therefore to be understood that within the scope of the appended claims, the invention may be practiced otherwise than as specifically described herein.

We claim:

1. A method comprising:
    at a wireless relay;
    during time slots of a first slot type, receiving communications on a first frequency band and transmitting communications on a second frequency band;
    during time slots of a second slot type that do not overlap with said time slots of the first type, receiving communications on the second frequency band and transmitting communications on the first frequency band, wherein:
    during time slots of the first slot type:
    said receiving comprises receiving communications from a transceiver of a first transceiver type on the first frequency band and said transmitting comprises transmitting communications to the transceiver of the first transceiver type on the second frequency band;
    during time slots of the second slot type:
    said receiving comprises receiving communications from at least one transceiver of a second transceiver type on the second frequency band and said transmitting comprises transmitting communications to at least one transceiver of the second transceiver type on the first frequency band.

2. A method according to claim 1 further comprising:
    at the wireless relay during time slots of a third slot type, transmitting substantially nothing.

3. A method according to claim 2 comprising operating in a defined sequence of time slots of the first, second and third slot types.

4. A method according to claim 1, wherein receiving communications on the first frequency band, transmitting communications on the second frequency band, receiving communications on the second frequency band and transmitting communications on the first frequency band are all done using a single transceiver chain.

5. A method according to claim 4 further comprising:
    between a slot of said first slot type and a next slot of said second slot type, reconfiguring the single transceiver to behave like a transceiver of a first transceiver type;
    between a slot of said second slot type and a next slot of said first slot type, reconfiguring the single transceiver to behave like a transceiver of a second transceiver type.

6. A method according to claim 1 further comprising:
    during time slots of said first slot type, the transceiver of the first type communications bi-directionally with the wireless relay;
    during time slots of said second slot type, at least one transceiver of the second type communicating bi-directionally with the wireless relay;
    during time slots of a third slot type, the transceiver of the first type communicating directly bi-directionally with at least one transceiver of the second type.

7. A system comprising a wireless relay, a transceiver of a first type, and at least one transceiver of a second type collectively adapted to implement a method according to claim 6.

8. A method according to claim 1 wherein all communications are OFDM (Orthogonal Frequency Division Multiplexing) communications.

9. A wireless relay adapted to implement a method according to claim 1.

10. A system comprising a wireless relay, a transceiver of a first type, and at least one transceiver of a second type collectively adapted to implement a method according to claim 1.

11. A method comprising:
    at a wireless relay:
    during time slots of a first slot type, receiving communications on a first frequency band and transmitting communications on a second frequency band;
    during time slots of a second slot type that do not overlap with said time slots of the first type, receiving communications on the second frequency band and transmitting communications on the first frequency band, wherein receiving communications on the first frequency band, transmitting communications on the second frequency band, receiving communications on the second frequency band and transmitting communications on the first frequency band are all done using a single transceiver chain;

between a slot of said first slot type and a next slot of said second slot type, reconfiguring the single transceiver to behave like a transceiver of a first transceiver type;

between a slot of said second slot type and a next slot of said first slot type, reconfiguring the single transceiver to behave like a transceiver of a second transceiver type, wherein:

reconfiguring the single transceiver to behave like a transceiver of the first transceiver type comprises connecting a first and second frequency signal for upconversion and downconverion respectively;

reconfiguring the single transceiver to behave like a transceiver of the second transceiver type comprises connecting the second and first frequency signal for upconversion and downconverting respectively.

12. A method according to claim 11 wherein:

reconfiguring the single transceiver to behave like a transceiver of the first transceiver type further comprises connecting a first filter and a second filter for receive and transmit filtering respectively;

reconfiguring the single transceiver to behave like a transceiver of the second transceiver type further comprises connecting the second filter and the first filter for receive and transmit filtering respectively.

13. A method according to claim 5 wherein the transceiver of the first transceiver type is a user equipment and the transceiver of the second transceiver type is a base station transceiver.

14. A method according to claim 5 wherein the transceiver of the first transceiver type is a network access node, and the transceiver of the second transceiver type is a base station transceiver.

15. A method comprising:

at a wireless relay:

during time slot of a first slot type, receiving communications on a first frequency band and transmitting communications on a second frequency band;

during time slots of a second slot type that do not overlap with said time slots of the first type, receiving communications on the second frequency band and transmitting communications on the first frequency band;

defining a first umbrella frequency band and a second umbrella frequency band;

during slots of both said first slot type and said second slot type, communicating directly from a transceiver of a first transceiver type and at least one transceiver of a second transceiver type on the first umbrella frequency band, and communicating directly from at least one transceiver of the second transceiver type and the transceiver of the first transceiver type on the second umbrella frequency band.

16. A method according to claim 15 wherein:

during time slots of the first slot type:

the wireless relay receives communications from the transceiver of the first transceiver type on the first frequency band and transmits communications to at least one transceiver of the second transceiver type on the second frequency band;

during time slots of the second slot type:

the wireless relay receives communications from at least one transceiver of the second transceiver type on the second frequency band and transmits communications to at least one transceiver of the second transceiver type on the first frequency band.

17. A method according to claim 15 wherein:

the first frequency band and the first umbrella band are adjacent and collectively comprise an uplink frequency band;

the second frequency band and the second umbrella band are adjacent and collectively comprise a downlink frequency band.

18. A method according to claim 15 comprising operating in a defined sequence of time slots of the first and second type.

19. A method according to claim 15, wherein receiving communications on the first frequency band and transmitting communications on the second frequency band, receiving communications on the second frequency band and transmitting communications on the first frequency band are all done using a single transceiver chain.

20. A method according to claim 19 further comprising:

between a slot of said first slot type and a slot of said second slot type, reconfiguring the single transceiver to behave like a transceiver of said first transceiver type;

between a slot of said second slot type and a slot of said first slot type, reconfiguring the single transceiver to behave like a transceiver of said second transceiver type.

21. A method according to claim 20 wherein:

reconfiguring the single transceiver to behave like a transceiver of the first transceiver type comprises connecting a first and second frequency signal for upconversion and downconverion respectively;

reconfiguring the single transceiver to behave like a transceiver of the second transceiver type comprises connecting the second and first frequency signal for upconversion and downconverion respectively.

22. A method according to claim 21 wherein:

reconfiguring the single transceiver to behave like a transceiver of the first transceiver type further comprises connecting a first filter and a second filter for receive and transmit filtering respectively;

reconfiguring the single transceiver to behave like a transceiver of the second transceiver type further comprises connecting the second filter and the first filter for receive and transmit filtering respectively.

23. A method according to claim 20 wherein the first transceiver type is a user equipment and the second transceiver type is a base station transceiver.

24. A method according to claim 20 wherein the first transceiver type is a network access node, and the second transceiver type is a base station transceiver.

25. A method according to claim 15 wherein all communications are OFDM (Orthogonal Frequency Division Multiplexing) communications.

26. A method according to claim 25 wherein:

the first umbrella band and the first frequency band together comprise a first OFDM band;

the second umbrella band and the second frequency band together comprise a second OFDM band.

27. A system comprising a wireless relay, a transceiver of a first type, and at least one transceiver of a second type collectively adapted to implement a method according to claim 15.

28. A method comprising:

at a wireless relay node:

during time slot of a first slots type, receiving communications on a first frequency band from a transceiver of a first transceiver type;

during time slots of a second slot type that do not overlap with said time slots of the first type, transmitting communications on the first frequency band to the transceiver of the first transceiver type;

during time slots of a third slot type that do not overlap with said time slots of the first type, receiving communications on the first frequency band from at least one transceiver of a second transceiver type;

during time slots of fourth slot type that do not overlap with said time slots of the first type, transmitting communications on the first frequency band to at least one transceiver of the second transceiver type;

during slots of said first slot type, said second slot type, said third slot type and said fourth slot type, communicating directly from the transceiver of the first transceiver type and at least one transceiver of the second transceiver type on a second frequency band, and communicating directly from at least one transceiver of the second transceiver type and the transceiver of the first transceiver type on a third frequency band.

29. A method according to claim 28 comprising operating in a defined sequence of time slots of the first, second, third and fourth slot type.

30. A method according to claim 28 wherein the first transceiver type is a user equipment and the second transceiver type is a base station transceiver.

31. A method according to claim 28 wherein the first transceiver type is a network access node, and the second transceiver type is a base station transceiver.

32. A method according to claim 28 wherein all communications are OFDM (Orthogonal Frequency Division Multiplexing) communications.

33. A method according to claim 32 wherein the second frequency band is a first OFDM band, and the first and third frequency band together comprise a second OFDM band.

34. A wireless relay adapted to implement a method according to claim 28.

35. A system comprising a wireless relay, a transceiver of a first type, and at least one transceiver of a second type collectively adapted to implement a method according to claim 28.

36. A wireless relay comprising:
a receive chain;
a transmit chain;
a first frequency filter and a second frequency filter alternatively switchable such that either the first frequency filter filters for the receive chain and the second frequency filter filters for the transmit chain, or the second frequency filter filters for the receive chain and the first frequency filter filters for the transmit chain;
a first frequency source and a second frequency source alternatively switchable such that either the first frequency source is connected to the receive chain and the second frequency source is connected to the transmit chain, or the second frequency source is connected to the receive chain and the first frequency source is connected to the transmit chain.

37. A wireless relay according to claim 36 comprising a first two by two switch which in a first state connects the first frequency source to the receive chain and connects the second frequency source to the transmit chain, and in a second state connects the second frequency source to the receive chain and connects the first frequency source to the transmit chain.

38. A wireless relay according to claim 37 comprising a second two by two switch which in a first state connects the first frequency filter to the receive chain and connects the second frequency filter to the transmit chain, and in a second state connects the second frequency filter to the receive chain and connects the first frequency filter to the transmit chain.

39. A wireless relay according to claim 38 wherein the first and second two by two switches each comprise a respective plurality of SPST (Single Pole Single Throw) switches.

40. A wireless relay according to claim 39 wherein each SPST switch comprises switching elements selected from a group consisting of: PiN diode, MEMS (Micro Electromechanical Systems) device, and high power FET.

41. A method comprising:
at a wireless relay:
configuring the relay to receive communications on a first frequency band and to transmit communications on a second frequency band;
configuring the relay to receive communications on the second frequency band and to transmit communications on the first frequency band;
defining a first umbrella frequency band and a second umbrella frequency band; and
communicating directly from a transceiver of a first transceiver type and at least one transceiver of a second transceiver type on the first umbrella frequency band, and communicating directly from at least one transceiver of the second transceiver type and the transceiver of the first transceiver type on the second umbrella frequency band.

42. A method according to claim 41 wherein:
the first frequency band and the first umbrella band are adjacent and collectively comprise an uplink frequency band; and
the second frequency band and the second umbrella band are adjacent and collectively comprise a downlink frequency band.

43. A method according to claim 41 wherein all communications are OFDM (Orthogonal Frequency Division Multiplexing) communications.

44. A method according to claim 43 wherein:
the first umbrella band and the first frequency band together comprise a first OFDM band; and
the second umbrella band and the second frequency band together comprise a second OFDM band.

45. A wireless relay adapted to implement a method according to claim 41.

46. A system comprising a wireless relay, a transceiver of a first type, and at least one transceiver of a second type collectively adapted to implement a method according to claim 41.

* * * * *

UNITED STATES PATENT AND TRADEMARK OFFICE
CERTIFICATE OF CORRECTION

PATENT NO.         : 7,349,665 B1
APPLICATION NO. : 10/736699
DATED                 : March 25, 2008
INVENTOR(S)       : Peiying Zhu et al.

It is certified that error appears in the above-identified patent and that said Letters Patent is hereby corrected as shown below:

Column 12, claim 6, line 31 "...communications..." should read -- ...communicating...--;
Column 13, claim 15, line 36 "...slot..." (first instance) should read --...slots...--;
Column 14, claim 28, line 63 "...slot..." (first instance) should read --...slots...--;
Column 14, claim 28, line 63 "...slots..." (second instance) should read --...slot...--;
Column 15, claim 33, line 33 "...band..." (first instance) should read --...bands...--.

Signed and Sealed this

Ninth Day of September, 2008

JON W. DUDAS
*Director of the United States Patent and Trademark Office*